United States Patent
Kishibata et al.

(10) Patent No.: US 7,301,247 B2
(45) Date of Patent: Nov. 27, 2007

(54) POWER SUPPLY DEVICE INCORPORATED IN VEHICLE DRIVEN BY INTERNAL COMBUSTION ENGINE

(76) Inventors: Kazuyoshi Kishibata, 3744 Ohka, Numazu-shi (JP); Masanori Nakagawa, 3744 Ohka, Numazu-shi (JP); Tooru Notsu, 3744 Ohka, Numazu-shi (JP)

(*) Notice: Subject to any disclaimer, the term of this patent is extended or adjusted under 35 U.S.C. 154(b) by 390 days.

(21) Appl. No.: 10/632,299

(22) Filed: Jul. 31, 2003

(65) Prior Publication Data

US 2004/0036294 A1 Feb. 26, 2004

(30) Foreign Application Priority Data

Aug. 23, 2002 (JP) .............................. 2002-242953

(51) Int. Cl.
*H02J 1/10* (2006.01)
(52) U.S. Cl. .............................. 307/44; 307/29; 307/84; 307/86
(58) Field of Classification Search ................ 307/44, 307/29, 84, 86
See application file for complete search history.

(56) References Cited

U.S. PATENT DOCUMENTS 5,077,485 A * 12/1991 Rashid ........................ 307/84
6,107,691 A * 8/2000 Gore et al. ................. 290/1 R
6,608,401 B1 * 8/2003 Walter ......................... 307/39

FOREIGN PATENT DOCUMENTS

| JP | 50-36341 | 4/1975 |
|---|---|---|
| JP | 50-138529 | 11/1975 |
| JP | 60-161225 | 8/1985 |

* cited by examiner

*Primary Examiner*—Michael Sherry
*Assistant Examiner*—Dru Parries
(74) *Attorney, Agent, or Firm*—Pearne & Gordon LLP

(57) ABSTRACT

A power supply device incorporated in a vehicle driven by an internal combustion engine including: a first power supply system for driving a vehicle load that converts an output of a generation coil provided in a generator driven by an internal combustion engine into a DC output to supply the DC output to an electrical load or electrical loads in the vehicle; and a second power supply system for driving an external load that converts an output of another generation coil provided in the generator into a DC output, then converts the DC output into an AC output at a commercial frequency with an inverter, and supplies the AC output to an external load, wherein the inverter is operated as a DC-DC converter to supply assisting power from the inverter through a switch to the first power supply system, when the output of the first power supply system is insufficient.

6 Claims, 3 Drawing Sheets

POWER SUPPLY DEVICE INCORPORATED IN VEHICLE DRIVEN BY INTERNAL COMBUSTION ENGINE

TECHNICAL FIELD OF THE INVENTION

The present invention relates to a power supply device incorporated in a vehicle driven by an internal combustion engine that supplies power to various electrical loads provided in the vehicle, and to an external load.

BACKGROUND OF THE INVENTION

In a vehicle driven by an internal combustion engine, power is supplied from a power supply system for a vehicle load that uses a generator driven by the internal combustion engine as a power source, through a power supply line (a power supply bus), to various electrical loads provided in the vehicles. Many of the electrical loads of the vehicles are components that require to be driven for driving the vehicles.

Depending on types or uses of vehicles, electrical loads provided in a vehicle include a battery, an ignition device, a fuel pump, a fuel injection device, and a control device that controls them. For a vehicle incorporating a battery of 12 V, a power supply system for a vehicle load is comprised so as to output a DC voltage of 14 V required for charging the battery.

On the other hand, in vehicles such as ATVs (All Terrain Vehicles) or tractors, a power supply system for an external load that outputs AC power at a commercial frequency is sometimes provided in addition to a power supply system for a vehicle load, in order to allow electric tools or home appliances to be used outdoors.

Some proposals have been made on a power supply device incorporated in a vehicle driven by an internal combustion engine having two power supply systems. For example, Japanese Patent Application Laid-Open No. 50-36341 proposes a power supply device in which two types of voltage outputs are obtained by switching outputs of one generator with a transfer switch.

Japanese Patent Application Laid-Open No. 50-138529 proposes a power supply device in which different voltage outputs are obtained by using a transformer.

Further, Japanese Patent Application Laid-Open No. 60-161225 proposes a power supply device in which two types of voltage outputs are obtained by providing two generators in a vehicle.

FIG. 4 shows a construction example of a conventional power supply device incorporated in a vehicle driven by an internal combustion engine when two types of voltage outputs are obtained by providing two generators in a vehicle. In FIG. 4, a reference numeral 1 denotes a generator for driving on-vehicle electrical components driven by an internal combustion engine, and an output of the generator is converted into a DC output by a DC power supply circuit 2 having a rectification function and a voltage adjustment function, and then supplied through a power supply line 3 to a battery 4 and other electrical loads 5.

A reference numeral 6 denotes a synchronous generator for driving an external load, and an AC output at a commercial frequency obtained from an armature coil 6A is supplied across AC output terminals 7a, 7b to which the external load is connected. It is provided a field current control unit 8 that controls a field current to be flowed through a field coil 6B of the generator according to an output voltage of the armature coil 6A, and the control unit controls the field current so as to keep the output voltage of the armature coil 6A at a set value (for example, 100 V).

In order to keep an output frequency of the generator at 50 Hz or 60 Hz, rotational speed control means (not shown) is provided that controls a rotational speed of the engine so as to keep a rotational speed of the generator at 3000 r/min or 3600 r/min.

In this example, the generator 1 and the DC power supply circuit 2 constitute a power supply system for a vehicle load A1, and the generator 6 and the field current control unit 8 constitute a power supply system for an external load A2.

In the power supply device incorporated in a vehicle driven by an internal combustion engine shown in FIG. 4, the generator 1 has an output characteristic of generating an output enough to charge the battery 4 from an idling time of the engine. The battery 4 is sometimes omitted.

When the two types of voltage outputs are obtained by switching the outputs of one generator with the transfer switch as described in Japanese Patent Application Laid-Open No. 50-36341, the battery cannot be charged while the transfer switch is switched so as to drive the external load, which may run the battery down. Further, the battery is required in order to drive an electrical component such as an ignition device that requires to be driven for driving the engine, while the external load is driven, which is not suitable for a vehicle having no battery.

When the different voltage outputs are obtained by using the transformer as described in Japanese Patent Application Laid-Open No. 50-138529, a transformer of large mass requires to be provided in a vehicle, thus undesirably increasing a weight of the vehicle.

As shown in FIG. 4, if the two generators are used to constitute the power supply system for a vehicle load and the power supply system for an external load, the electrical component of the vehicle can be driven even when the external load is driven, thus solving the problem that the battery cannot be charged while the external load is driven. Further, the construction as shown in FIG. 4 allows a power supply system that drives the external load in a vehicle having no battery.

As shown in FIG. 4, when the two generators are provided, the generators are preferably made as small as possible for minimum increases in a size and a weight of the engine. However, the capacity of the generator 6 used in the power supply system for an external load depends on external loads to be driven, and thus a reduction in a size of the generator 6 is limited. In the construction in FIG. 4, the battery requires to be charged with the output of the generator 1 in the power supply system for a vehicle load from the idling time of the engine, and thus a large generator that generates a large output from a low speed time requires to be used as the generator 1. Therefore, the construction in FIG. 4 requires two large generators in the engine to increase the size and the weight of the engine. When the two generators are used as described above, the generator used in the power supply system for a vehicle load is preferably made as small as possible.

In order to reduce the size of the internal combustion engine, and reduce the number of parts for easy assembly, it is preferable that a generation coil provided in one generator is used to constitute two power supply systems: a power supply system for a vehicle load; and a power supply system for an external load. In this case, the increase in the size of the generator requires to be minimized.

SUMMARY OF THE INVENTION

Therefore, an object of the invention is to provide a power supply device incorporated in a vehicle driven by an internal combustion engine that allows a reduction in a size of a generator used in a power supply system for a vehicle load, and thus reductions in a size and a weight of the engine, when two generators are used to constitute the power supply system for a vehicle load and a power supply system for an external load.

Another object of the invention is to provide a power supply device incorporated in a vehicle driven by an internal combustion engine that allows a power supply system for a vehicle load and a power supply system for an external load to be provided in the same generator without increasing a size of a generator, and thus allows reductions in a size, a weight, and the number of parts of the engine.

The invention is applied to a power supply device incorporated in a vehicle driven by an internal combustion engine including: a power supply system for a vehicle load (hereinafter referred to a first power supply system) that uses a generation coil for a vehicle load (hereinafter referred to a first generation coil) provided in a generator driven by an internal combustion engine as a power source to supply DC power to a power supply line that provides a power supply voltage to an electrical load or electrical loads provided in the vehicle; and a power supply system for an external load (hereinafter referred to a second power supply system) that uses a generation coil for an external load (hereinafter referred to a second generation coil) provided in the generator or provided in another generator driven by the internal combustion engine as a power source to supply power to an external load. In the invention, a power supply circuit for assistance is provided that supplies a DC output having a voltage value equal to or close to a rated value of an output voltage of the first power supply system, from the second power supply system to the power supply line, to assist the first power supply system.

When the external load is driven in the power supply device according to the invention, the internal combustion engine is operated at a high rotational speed at which the generator can be efficiently operated. Thus, even if the number of turns of the first generation coil, or the number of poles of an armature core around which the first generation coil is wound is reduced to make a small generator, an output enough to charge a battery or to drive other electrical components can be obtained.

When the vehicle is driven, the reduced number of turns of the first generation coil prevents the battery from being charged when the engine is driven at a low rotational speed such as an idling speed, which may run the battery down.

If no battery is provided, the electrical component such as an ignition device cannot be driven when the rotational speed of the engine decreases, which may stop the engine.

Thus, as the invention, a circuit is provided that supplies a DC output with an adjusted voltage value from the second power supply system to the power supply line that provides the power supply voltage to the electrical component of the vehicle, and when an output of the first power supply system is insufficient, the DC output provided from the second power supply system to the power supply line can cover the insufficiency. Thereby, even if the first generation coil that is used as the power source of the first power supply system is small, sufficient power can be supplied to the electrical component when the engine is operated at a low speed.

According to the invention, the first generation coil may be such as to generate the output required for driving the electrical component in a high speed rotation area where the rotational speed of the engine exceeds a set speed, thus the first generation coil may be much smaller than that used in a conventional power supply device of this type. Therefore, according to the invention, the first generation coil and the second generation coil can be placed in a common generator without increasing the size of the generator.

When a generator used in the first power supply system and a generator used in the second power supply system are provided separately, the generator used in the first power supply system may be small for the reason as described above, thus reducing the size and the weight of the engine compared to when the conventional power supply device of this type is used.

A voltage value of an assisting output provided from the second power supply system to the first power supply system may be set to a value equal to or close to a rated value of the voltage provided from the first power supply system to the power supply line, but the voltage value is desirably set to a value slightly lower than the rated value of the output voltage of the first power supply system. When the voltage value of the assisting output is set to the value slightly lower than the rated value of the output voltage of the first power supply system, automatic transfer to a state where no assistance is provided from the second power supply system is advantageously performed at the time when the output voltage of the first power supply system reaches the rated value.

It is preferable to use what is known as an inverter generator as the second power supply system. The inverter generator includes: a DC power supply unit that uses the second generation coil as the power source to generate a DC output, the second generation coil being provided in the generator where the first generation coil used as the power source of the first power supply system is provided, or provided in another generator driven by the internal combustion engine; and an inverter that converts the output of the DC power supply unit into an AC output at a commercial frequency.

When the invention is applied to a power supply device incorporated in a vehicle driven by an internal combustion engine, including the second power supply system, there are provided: a transfer switch that switches a supply target of an output of the second power supply system, so as to supply the output of the second power supply system across output terminals to which an external load is connected when the external load is driven, and supply power from the second power supply system to the power supply line when the external load is not driven; and inverter control means for assistance for controlling switch elements that constitute the inverter, so as to operate the inverter as a DC-DC converter when the transfer switch is switched so as to supply the power from the second power supply system to the power supply line, and supply a DC voltage equal to or close to a rated value of an output voltage of the first power supply system from the second power supply system to the power supply line so as to assist the first power supply system.

With the above described construction, the DC output with the adjusted voltage value can be supplied from the inverter to the power supply line to assist the first power supply system when the engine is operated at the low speed, thus allowing the first generation coil to be small.

As the inverter, a bridge type inverter can be used, which has four switch elements that are connected to form a single-phase bridge.

In this case, the inverter control means for assistance may be comprised so as to use a pair of switch elements, among the switch elements that constitute the inverter, as switch elements that constitute the DC-DC converter, the switch elements being to be turned on in order to output, from the inverter, a voltage having the same polarity as a DC voltage applied across output terminals of the inverter from a side of the power supply line when the first power supply system is assisted, keep one of the pair of switch elements in an ON state, and turn on/off the other of the switch elements in a predetermined duty ratio, thereby causing the inverter to output the DC output having the voltage value equal to or close to the rated value of the output voltage of the first power supply system.

In the above described construction, the inverter is operated as the DC-DC converter to provide the assisting DC output from an output side of the inverter to the power supply line of the vehicle electrical component. Alternatively, the assisting DC power may be provided to a power supply line that extends from a DC power supply unit provided in front of the inverter in the second power supply system to the vehicle electrical component.

In this case, the DC power supply unit provided in front of the inverter has a voltage adjustment function, and a transfer switch is provided that switches a supply target of the output of the DC power supply unit so as to supply the output of the DC power supply unit to the inverter when the external load is driven, and supply the power of the DC power supply unit to the power supply line that provides a power supply voltage to the electrical loads of the vehicle when the external load is not driven.

Voltage adjustment means for assistance is provided, for adjusting an output voltage of the DC power supply unit, so as to supply a DC output having a voltage value equal to or close to a rated value of an output voltage of the first power supply system, from the DC power supply unit to the power supply line, when the transfer switch is switched so as to supply the output of the DC power supply unit to the power supply line.

For providing the DC power supply unit with the voltage adjustment function, the DC power supply unit may include, for example, a control rectifier circuit constituted by a hybrid bridge circuit of a diode and a thyristor, to control a conduction angle of the thyristor of the control rectifier circuit, and thus adjust the output voltage value.

When a magneto is used as the generator, a rectifier circuit that rectifies an output of the generator, and a circuit that shorts the output of the generator when an output voltage of the rectifier circuit exceeds an adjusted value are provided to constitute a DC power supply unit having a voltage adjustment function.

BRIEF DESCRIPTION OF THE DRAWINGS

The above and other objects and features of the present invention will be apparent from the detailed description of the preferred embodiments of the invention, which is described and illustrated with reference to the accompanying drawings, in which.

DETAILED DESCRIPTION OF THE PREFERRED EMBODIMENTS

Figure 1:
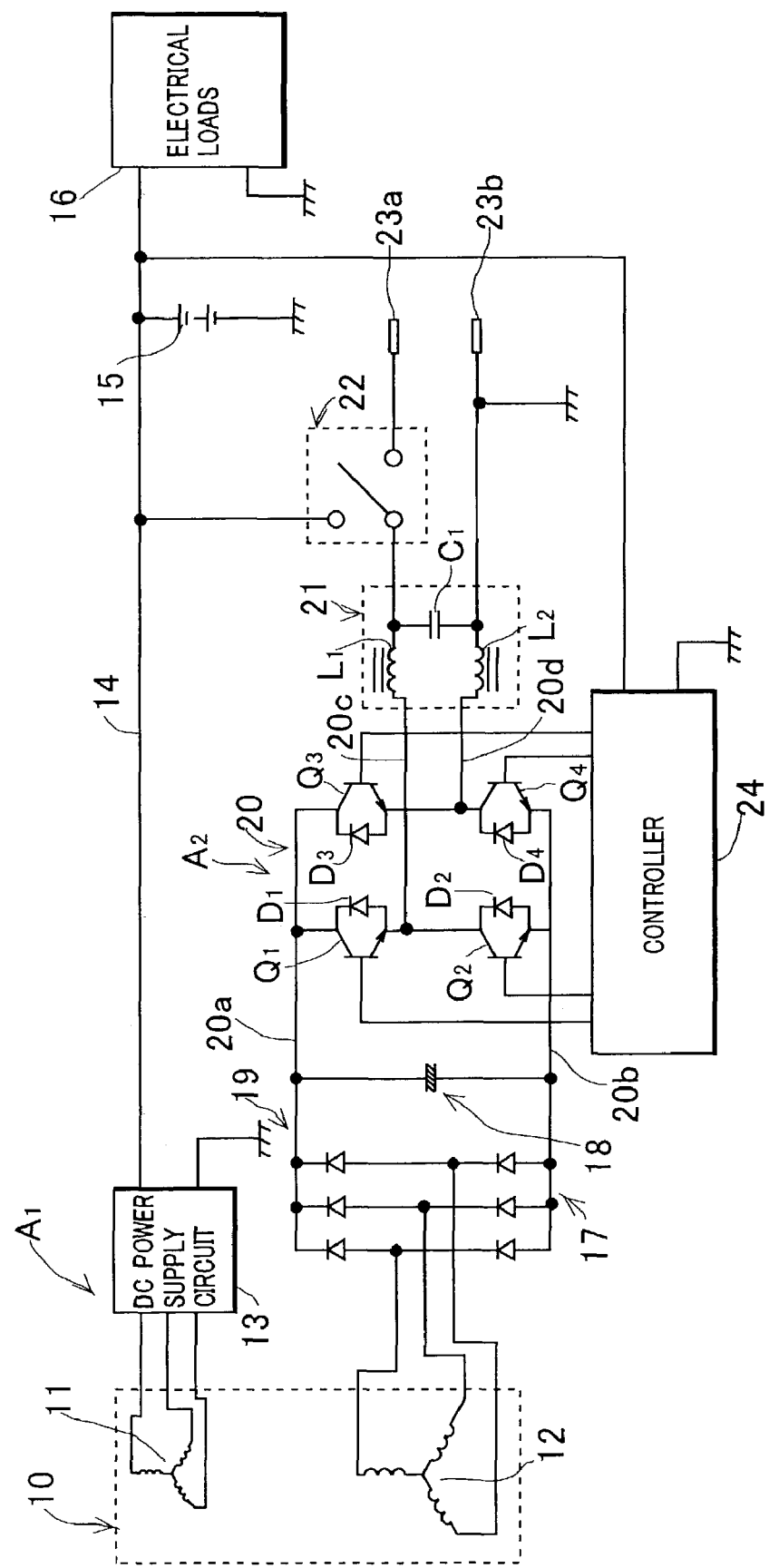
FIG. 1 is a schematic circuit diagram of a construction example of a power supply device according to the present invention.

Now, embodiments of the invention will be described with reference to the drawings. FIG. 1 shows an embodiment of a power supply device according to the invention. In this example, there are provided a first generation coil 11 that constitutes a power source of a first power supply system A1 in a flywheel magneto 10 driven by an internal combustion engine for driving a vehicle, and a second generation coil 12 that constitute a power source of a second power supply system A2. In the shown example, the first generation coil 11 and the second generation coil 12 are both formed by three-phase generation coils. The first generation coil 11 has an output characteristic set so as to generate an output equal to or higher than a minimum output required for charging a battery and driving other electrical loads in a high speed area where a rotational speed of the engine is equal to or higher than a set speed (for example, 2500 r/min) that is set sufficiently higher than an idling speed (approximately 1000 r/min).

Figure 3:
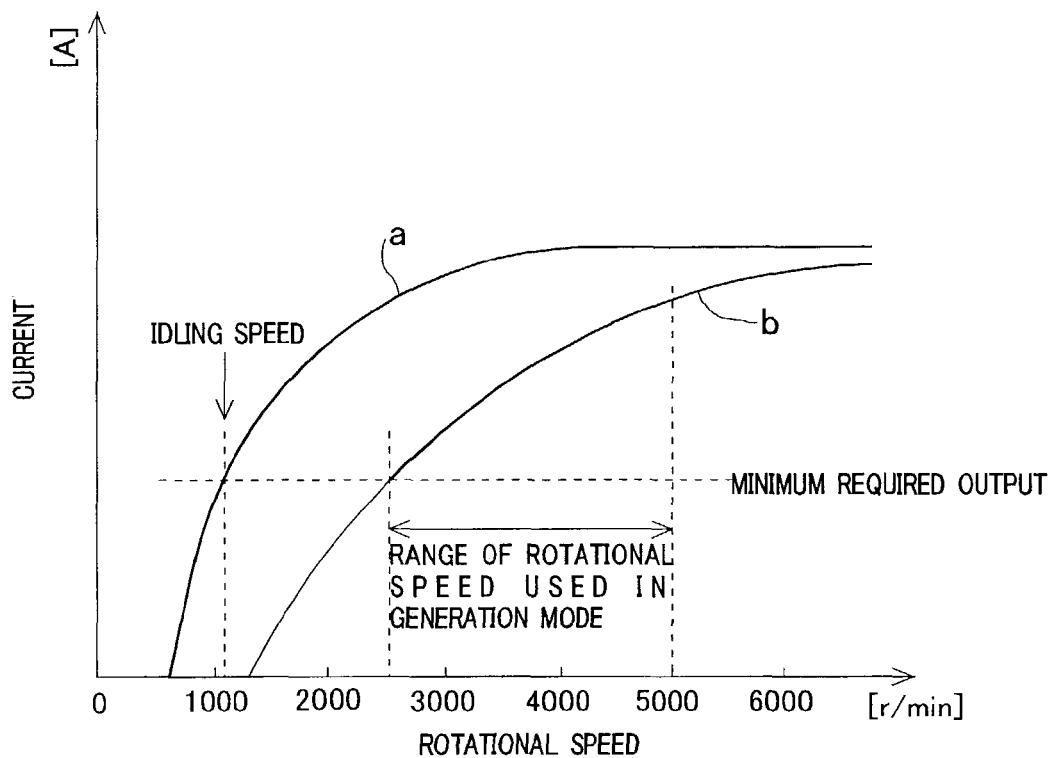
FIG. 3 is a graph comparing a characteristic of an output current to a rotational speed of a first generation coil used in the power supply device according to the invention, with a characteristic of an output current to a rotational speed of a first generation coil used in a conventional power supply device.
Figure 4:
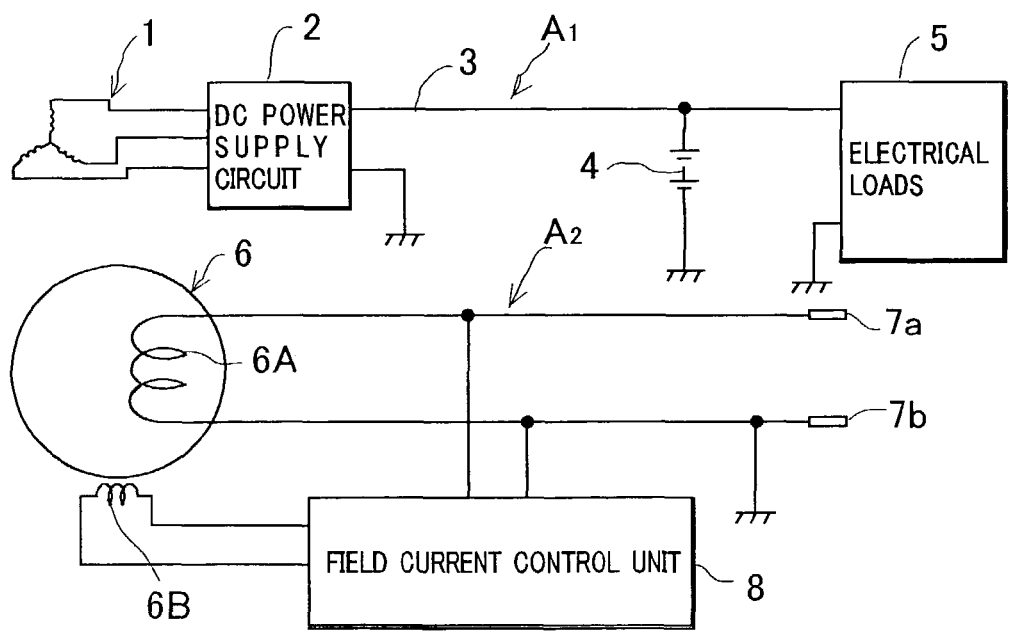
FIG. 4 is a schematic circuit diagram of a construction of a conventional power supply device.

FIG. 3 shows a characteristic of an output current to a rotational speed a of the generator when an output required for charging a battery and driving other electrical loads in a speed area of 1000 r/min or more is generated, and a characteristic of an output current to a rotational speed b of the generator when an output required for charging a battery and driving other electrical loads in a speed area of 2500 r/min or more is generated, in the flywheel magneto. When the output required at the rotational speed of 2500 r/min or more is obtained, the number of turns of the first generation coil may be reduced by a factor of 2.5 of that when the output required at the rotational speed of 1000 r/min or more is obtained, thus reducing a size of the generator.

An AC output of the first generation coil 11 is input to a DC power supply circuit 13 having a rectification function and a voltage adjustment function. The DC power supply circuit 13 includes, for example, a hybrid bridge rectifier circuit of a diode and a thyristor, and a control unit that controls a conduction angle of the thyristor of the rectifier circuit, and outputs a DC voltage of a voltage value adjusted to a set value (14 V, in this example). This DC voltage is applied to a battery 15 and other electrical loads 16 through a power supply line 14. The electrical loads 16 include an ignition device for an internal combustion engine, a fuel injection device, or the like. In this example, the first generation coil 11 and the DC power supply circuit 13 constitute the first power supply system A1.

An output of the second generation coil 12 is input to a DC power supply unit 19 including a three-phase diode bridge rectifier circuit 17 and a smoothing capacitor 18 connected across output terminals of the rectifier circuit 17, and a DC voltage obtained from the DC power supply unit 19 is input to an inverter 20. The inverter 20 is a known bridge type inverter having four bridge-connected switch elements Q1 to Q4 and diodes D1 to D4 connected anti-parallel to the switch elements Q1 to Q4, respectively, and an output voltage of the DC power supply unit 19 is applied across DC terminals 20a, 20b of the inverter 20.

In the shown example, NPN transistors are used as the switch elements Q1 to Q4, but the switch elements may be such as to be turned on/off, and other switches such as MOSFETs or IGBTs may be used.

An AC output obtained across AC terminals 20c, 20d of the inverter 20 is input to a filter circuit 21 including coils L1, L2 and a capacitor C1, and one of output terminals of the filter circuit 21 is switchably connected to one 23a of output terminals 23a, 23b to which an external load is connected, and the power supply line 14 by a transfer switch 22 that switches a supply target of the output of the inverter. The other of the output terminals of the filter circuit 21 is connected to the output terminal 23b and grounded to a vehicle body for safety. The filter circuit 21 is provided in order to remove harmonic components from the output of the inverter.

A controller 24 is provided that is operated by a power supply voltage provided from the power supply line 14, and the controller 24 controls the unshown internal combustion engine, the transfer switch 22, and the inverter 20.

In this example, the second generation coil 12, the DC power supply unit 19, the inverter 20, and the filter circuit 21 constitute the second power supply system A2.

The power supply device in FIG. 1 is operated with its operation mode being a generation mode, when the vehicle is stopped to drive the external load connected across the output terminals 23a, 23b. When the vehicle is driven, the power supply device is operated with its operation mode being a vehicle driving mode. The operation mode can be switched by operating an unshown mode transfer switch.

The controller 24 includes a microprocessor, and causes the microprocessor to execute a predetermined program to constitute transfer switch control means, throttle control means for driving vehicle, throttle control means for generation, inverter control means for generation, and inverter control unit for assistance.

The transfer switch control means switches a supply target of an output of the second power supply system A2 according to a selected operation mode, such that the transfer switch control means switches the transfer switch 22 so as to supply an output of the second power supply system A2 across the output terminals 23a, 23b to which the external load is connected, when the generation mode is selected as the operation mode and the generation coil 11 enters a state of generating an output equal to or higher than a set value in a process where the throttle control means for generation increases a rotational speed of the engine as described later, and switches the transfer switch 22 so as to supply assisting power from the second power supply system A2 to the power supply line 14, when the vehicle driving mode is selected.

In order to prevent shortage of power supplied to the electrical loads of the engine when the engine is rotated at a low speed with a low output of the generation coil 11, the transfer of the supply target of the output of the second power supply system A2 to the output terminals 23a, 23b is performed after the generation coil 11 enters the state of generating the output voltage equal to or more than the set value.

The throttle control means for driving vehicle controls a throttle actuator that operates a throttle valve depending on outputs of a sensor that detects an amount of displacement of an axle, so as to change a throttle valve opening degree of the internal combustion engine depending on amounts of displacement of the axle operated by a driver, when the vehicle driving mode is selected as the operation mode.

The throttle control means for generation controls the actuator that operates the throttle valve to increase the rotational speed of the engine, when the generation mode is selected and it is confirmed that a transmission provided between a crankshaft of the internal combustion engine and drive wheels of the vehicle is in a neutral position or a parking position, and performs feedback control of the throttle actuator so as to rotate the engine at a rotational speed required for keeping the DC voltage at a target voltage, after the DC voltage output by the DC power supply unit 19 reaches the target voltage. Changes in the rotational speed of the engine when the generation mode is selected within, for example, 2500 r/min to 5000 r/min as in FIG. 3.

The inverter control means for generation drives the switch elements Q1 to Q4 that constitute the inverter 20 so as to obtain a sine wave AC voltage at a commercial frequency across the output terminals 23a, 23b, after the output voltage of the DC power supply unit 19 reaches the target voltage.

A driving method of the inverter 20 is similar to that of a general inverter generator, and a drive signal is provided to the switch elements Q1, Q4 to turn on the switch elements when a positive half-wave voltage is obtained across the output terminals, and a drive signal is provided to the switch elements Q2, Q3 to turn on the switch elements when a negative half-wave voltage is obtained across the output terminals. PWM modulation of the drive signal provided to the switch elements Q1, Q3 that form an upper side of a bridge or the switch elements Q2, Q4 that form a lower side of the bride, so as to obtain an instantaneous value at each phase angle of a sine waveform, is performed for PWM control of the output of the inverter, thus providing the sine wave output voltage across the output terminals 23a, 23b.

The inverter control means for assistance controls the switch elements that constitute the inverter, so as to operate the inverter 20 as a DC-DC converter, and supply a DC power having a voltage value equal to or close to a rated value (14 V) of an output voltage of the first power supply system A1, from the second power supply system A2 to the power supply line 14, to assist the first power supply system A1, when the vehicle driving mode is selected and the transfer switch 22 is switched so as to supply the power from the second power supply system A2 to the power supply line 14.

Specifically, the inverter control means for assistance is comprised so as to use a pair of switch elements Q1, Q4, among the switch elements that constitute the inverter 20, as switch elements that constitute the DC-DC converter, the switch elements Q1, Q4 being to be turned on in order to output, from the inverter 20, a voltage having the same polarity as a DC voltage applied across output terminals of the inverter from a side of the power supply line 14 when the first power supply system A1 is assisted, keep one of the pair of switch elements Q1, Q4 in an ON state, and turn on/off the other of the switch elements in a predetermined duty ratio, thereby causing the inverter to output the DC output having the voltage value adjusted to be equal to or close to the rated value of the output voltage of the first power supply system.

For automatic transfer to a state where no assistance is provided from the second power supply system A2 at the time when the output voltage of the first power supply system A1 reaches the rated value, an assisting DC voltage provided from the second power supply system A2 to the power supply line 14 is preferably set to a value higher than the rated voltage (12 V) of the battery and slightly lower than the rated value (14 V) of the output voltage of the first power supply system.

Operations of the power supply device in FIG. 1 will be described below.

When the generation mode is selected in the power supply device in FIG. 1, the vehicle is stopped, the transmission is set to the neutral position or the parking position by the driver, and then the unshown mode transfer switch is operated such that the operation mode is the generation mode.

When the operation mode is the generation mode, the throttle control means for generation provided in the controller 24 controls the throttle actuator to increase the rotational speed of the internal combustion engine, and increase the output of the generation coil 12. When the generation coil 11 enters the state of generating the output equal to or higher than the set value (a state of generating an output required for driving a vehicle load) in a process where the rotational speed of the internal combustion engine increases, the transfer switch control means provided in the controller 24 switches the transfer switch 22 such that the supply target of the output of the second power supply system A2 becomes the output terminals 23a, 23b to provide for an output of AC power at a commercial frequency.

Once the output voltage of the DC power supply unit 19 reaches a target voltage (a voltage required for causing the inverter to output the AC voltage of the rated value), the throttle control means for generation performs feedback control of the throttle actuator so as to rotate the engine at the rotational speed required for keeping the output voltage of the DC power supply unit at the target voltage against a load change. In this embodiment, as shown in FIG. 3, the rotational speed of the engine is controlled within 2500 to 5000 r/min when the generation mode is selected.

When the output voltage of the DC power supply unit 19 reaches the target voltage, the inverter control means for generation provided in the controller 24 drives the switch elements of the inverter 20 to cause the inverter to output the AC voltage at the commercial frequency.

When the vehicle driving mode is selected, the transfer switch control means provided in the controller 24 switches the transfer switch 22 such that the supply target of the output of the second power supply system becomes the power supply line 14.

When the rotational speed of the engine is in a low speed area from an idling speed to a set speed (a rotational speed at which a minimum voltage required for the first generation coil 11 to charge the battery is output), the output voltage of the first power supply system A1 does not reach the battery voltage (the rated voltage of the battery), and thus the output of the first power supply system A1 cannot charge the battery. In the low speed area, the output of the generation coil 11 is small, and thus even if the output voltage of the generation coil 11 reaches the voltage of the battery, the electrical loads of the vehicle cannot be driven.

On the other hand, the generation coil 12 used as the power source of the second power supply system is comprised so as to have an output characteristic of high voltage and high output, and generates a sufficiently large output compared to the generation coil 11 even in the low speed area of the engine. Thus, the output required for charging the battery and driving other electrical loads can be generated even in the low speed area where the rotational speed of the engine is lower than the set rotational speed.

The inverter control means for generation provided in the controller 24 uses the pair of switch elements Q1, Q4 of the inverter 20 as the switch elements that constitute the DC-DC converter, keeps one of the switch elements, for example, the switch element Q4 in an ON state, turns on/off the switch element Q1 in a predetermined duty ratio so as to match the voltage of the power supply line 14 to a target voltage (a voltage slightly lower than 14 V), and performs PWM control of a current flowing through the switch elements Q1, Q4, thereby supplying a DC voltage equal to the target voltage to the power supply line 14. At this time, the controller 24 detects the voltage of the power supply line 14 and performs feedback control so as to keep the voltage of the DC output provided from the second power supply system for driving an external load to the power supply line at the target value. In this embodiment, the controller 24 obtains the power supply voltage from the power supply line 14, thus the voltage of the power supply line can be detected by observing the power supply voltage of the controller.

In the invention, a small generation coil that can generate the output required for charging the battery and driving other electrical loads only in the high speed area where the rotational speed of the engine exceeds the set speed is used as the first generation coil, but in the low speed area where the rotational speed of the engine is equal to or lower than the set speed as described above, the DC power is supplied from the second power supply system A2 to the power supply line 14 to assist the first power supply system A1. Thus, even in the low speed area of the engine, the battery 15 can be charged and the electrical loads 16 can be driven to allow the operation of the engine without a hitch.

In the vehicle driving mode, when the unshown throttle valve is opened to increase the rotational speed of the engine, the output of the generation coil 11 increases to provide the output of the rated value required for charging the battery 15 and driving the electrical loads 16 from the DC power supply circuit 13 to the power supply line 14.

In the embodiment, the target voltage (adjusted voltage) of the assisting DC output provided from the second power supply system A2 to the power supply line 14 is set slightly lower than the rated value (14 V) of the DC voltage provided from the first power supply system A1 to the power supply line 14. Thus, when the first power supply system generates the output of the rated value, the DC output provided from the inverter 20 to the power supply line 14 is automatically reduced to zero. The output of the first power supply system for a driving a vehicle load covers all the power required for charging the battery 15 and the power required for driving the electrical loads of the vehicle in the high speed area where the rotational speed of the engine exceeds the set speed.

Figure 2A:
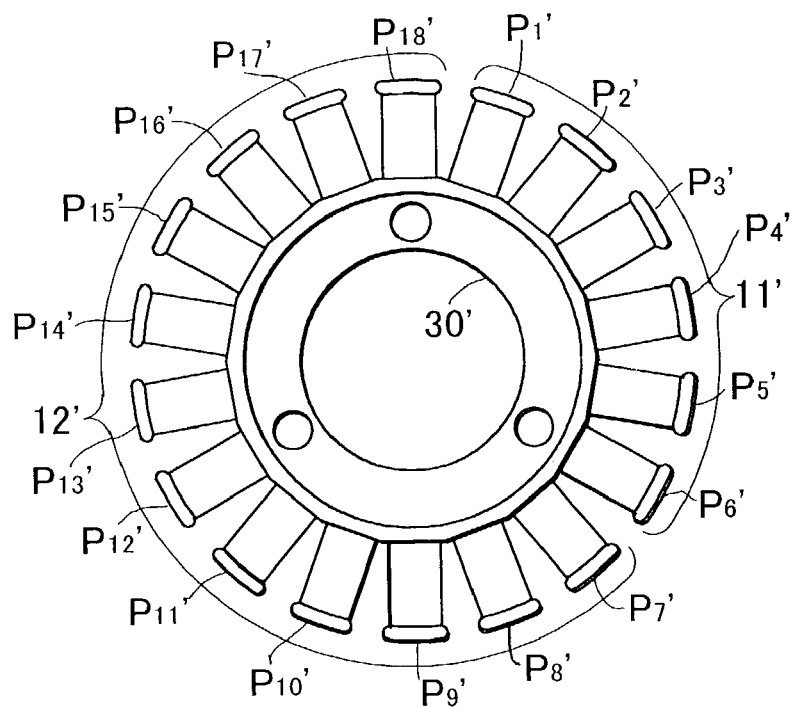
FIG. 2A is a front view of a stator of a magneto used when no assistance is provided from a second power supply system to a first power supply system.
Figure 2B:
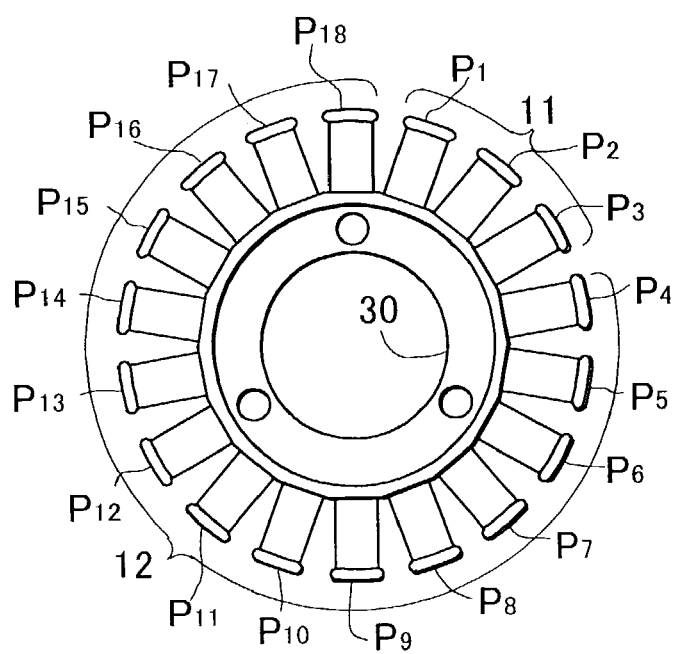
FIG. 2B is a front view of a stator of a generator used in the power supply device according to the invention, in which assistance is provided from a second power supply system to a first power supply system.

FIGS. 2A and 2B show a comparison of constructions and sizes of stators of flywheel magnetos used when no assistance is provided from the second power supply system to the first power supply system, and when assistance is provided from a second power supply system to a first power supply system as in the invention.

FIG. 2A shows a stator of a magneto used when no assistance is provided from the second power supply system to the first power supply system. In the stator, an 18-pole armature core 30' has 18 salient poles P1' to P18', and a first generation coil 11' is wound around 6 salient poles P1' to P6', and a second generation coil 12' is wound around the other 12 salient poles P7' to P18'.

FIG. 2B shows a stator of the magneto 10 used in the power supply device according to the invention in FIG. 1. An 18-pole armature core 30 has 18 salient poles P1 to P18, and the first generation coil 11 is wound around 3 salient poles P1 to P3, and the second generation coil 12 is wound around the other 15 salient poles P4 to P18.

As shown in FIGS. 2A and 2B, when the assistance is provided from the second power supply system to the first power supply system while the engine is rotated at the low speed as the invention, the stator of the magneto can be much smaller than that when no assistance is provided from the second power supply system to the first power supply system.

In the above described embodiment, a circuit that passes from the generation coil 12 through the DC power supply unit 19, the inverter 20, the filter 21, and the transfer switch 22 to the power supply line 14 constitutes a power supply circuit for assistance that supplies the DC output having the voltage value equal to or close to the rated value of the output voltage of the first power supply system A1 for driving a vehicle load from the second power supply system A2 for driving an external load to the power supply line 14 to assist the first power supply system.

In the above described embodiment, the assisting power is supplied from an output side of the inverter 20 through the filter 21 to the power supply line, but the DC power supply unit 19 may have the voltage adjustment function to supply the assisting power with a voltage value adjusted to a value around the charging voltage (14 V) of the battery 15 from an output side of the DC power supply unit 19 to the power supply line 14.

In this case, the transfer switch is provided that switches the supply target of the output of the DC power supply unit 19 so as to supply the output of the DC power supply unit 19 to the inverter 20 when the external load is driven, and supply the output of the DC power supply unit 19 to the power supply line 14 when the external load is not driven.

Voltage adjustment means for assistance is provided in the controller 24, for adjusting an output voltage of the DC power supply unit, so as to supply a DC output having a voltage value equal to or close to a rated value of an output voltage of the first power supply system A1 from the DC power supply unit 19 to the power supply line 14 to assist the first power supply system, when the transfer switch is switched so as to supply the output of the DC power supply unit 19 to the power supply line 14.

In the above described embodiment, the first generation coil 11 and the second generation coil 12 are provided in one generator driven by the internal combustion engine, but the first generation coil 11 and the second generation coil 12 may be provided in different generators. When the generation coils are provided in different generators, two generators are mounted to the internal combustion engine, but according to the invention, the generator in which the first generation coil is provided can be made small, thus reducing the size and the weight of the engine compared to the conventional power supply device in which two generators are used to constitute a first power supply system and a second power supply system.

In the above described embodiment, the power supply voltage of the controller 24 is obtained from the first power supply system A1, but the power supply voltage of the controller 24 may be obtained from another wiring provided in the flywheel magneto through a constant voltage power supply circuit. In this case, the output voltage when the first power supply system is assisted is detected by a voltage detection circuit provided on an output side of the filter 21.

In the above described embodiment, the first generation coil 11 and the second generation coil 12 are formed by the three-phase generation coil, but one or both of them may be formed by a single-phase generation coil.

In the embodiment in FIG. 1, the transfer switch 22 is controlled according to the selected operation mode and the output of the generation coil 11 so as to transfer the supply target of the output of the inverter to the output terminals 23a, 23b when the first generation coil 11 generates the output equal to or higher than the set value, and the generation coil 11 enters the state of generating the output required for driving the vehicle loads, in the process where the generation mode is selected and then the throttle control means for generation increases the rotational speed of the engine, and so as to transfer the supply target of the output of the inverter to the power supply line 14 when the vehicle driving mode is selected. Alternatively, the transfer switch may be controlled according to the rotational speed of the engine so as to transfer the supply target of the output of the inverter to the power supply line 14 when the rotational speed of the engine is equal to or lower than the set value (a rotational speed at which the first generation coil generates a required output), and so as to transfer the supply target of the output of the inverter to the output terminals 23a, 23b when the rotational speed exceeds the set speed.

In this way, when the transfer switch is controlled as described above, the inverter control means for assistance may be also comprised so as to control the switch elements that constitute the inverter, so as to operate the inverter as the DC-DC converter when the transfer switch is switched so as to supply the power from the second power supply system to the power supply line, and so as to supply the DC output having the voltage value equal to or close to the rated value of the output voltage of the first power supply system, from the second power supply system to the power supply line in order to assist the first power supply system.

As described above, according to the invention, the assisting power is provided from the second power supply system to the power supply line of the vehicle electrical loads when the engine is rotated at the low speed, thereby eliminating the need for the generation coil of the first power supply system to generate the large output when the engine is rotated at the low speed, and reducing the size and the weight of the generator, thus reducing the size and the weight of the engine.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A power supply device incorporated in a vehicle driven by an internal combustion engine comprising:
a first power supply system that uses a first generation coil provided in a generator driven by said internal combustion engine as a power source to supply DC power to a power supply line that provides a power supply voltage to an electrical load or electrical loads provided in the vehicle;
a second power supply system having a DC power supply unit that uses a second generation coil provided in said generator as a power source to generate a DC output, and an inverter that converts the output of said DC power supply unit into an AC output at a commercial frequency; a transfer switch that switches a supply target of an output of said second power supply system, so as to supply the output of said second power supply system across output terminals to which an external load is connected when the external load is driven, and supply power from said second power supply system to said power supply line when said external load is not driven; and inverter control means for assistance for controlling switch elements that constitute said inverter, so as to operate said inverter as a DC-DC converter when said transfer switch is switched so as to supply the power from said second power supply system to said power supply line, and so as to supply a DC output having a voltage value equal to or close to a rated value of an output voltage of said first power supply system from said second power supply system to said power supply line in order to assist the first power supply system.

2. The power supply device incorporated in a vehicle driven by an internal combustion engine according to claim 1, wherein said inverter is a bridge type inverter having four switch elements that are connected to form a single-phase bridge, and said inverter control means for assistance is comprised so as to use a pair of switch elements, among the switch elements that constitute said inverter, as switch elements that constitute the DC-DC converter, said switch elements being to be turned on in order to output, from said inverter, a voltage having the same polarity as a DC voltage applied across output terminals of said inverter from a side of said power supply line when said first power supply system is assisted, to keep one of said pair of switch elements in an ON state, and to turn on/off the other of said switch elements in a predetermined duty ratio, thereby causing the inverter to output the DC output having the voltage value equal to or close to the rated value of the output voltage of the first power supply system.

3. A power supply device incorporated in a vehicle driven by an internal combustion engine comprising:

a first power supply system that uses a first generation coil provided in a generator driven by said internal combustion engine for driving a vehicle as a power source to supply DC power to a power supply line that provides a power supply voltage to an electrical load or electrical loads provided in the vehicle;

a second power supply system having a DC power supply unit that uses a second generation coil provided in another generator driven by said internal combustion engine as a power source to generate a DC output, and an inverter that converts the output of said DC power supply unit into an AC output at a commercial frequency;

a transfer switch that switches a supply target of an output of said second power supply system, so as to supply the output of said second power supply system across output terminals to which an external load is connected when the external load is driven, and supply power from said second power supply system to said power supply line when said external load is not driven; and inverter control means for assistance for controlling switch elements that constitute said inverter, so as to operate said inverter as a DC-DC converter when said transfer switch is switched so as to supply the power from said second power supply system to said power supply line, and so as to supply a DC output having a voltage value equal to or close to a rated value of an output voltage of said first power supply system from said second power supply system to said power supply line in order to assist the first power supply system.

4. The power supply device incorporated in a vehicle driven by an internal combustion engine according to claim 3, wherein said inverter is a bridge type inverter having four switch elements that are connected to form a single-phase bridge, and said inverter control means for assistance is comprised so as to use a pair of switch elements, among the switch elements that constitute said inverter, as switch elements that constitute the DC-DC converter, said switch elements being to be turned on in order to output, from said inverter, a voltage having the same polarity as a DC voltage applied across output terminals of said inverter from a side of said power supply line when said first power supply system is assisted, to keep one of said pair of switch elements in an ON state, and to turn on/off the other of said switch elements in a predetermined duty ratio, thereby causing the inverter to output the DC output having the voltage value equal to or close to the rated value of the output voltage of the first power supply system.

5. A power supply device incorporated in a vehicle driven by an internal combustion engine comprising:

a first power supply system that uses a first generation coil provided in a generator driven by said internal combustion engine for driving a vehicle as a power source to supply DC power to a power supply line that provides a power supply voltage to an electrical load or electrical loads provided in the vehicle;

a second power supply system having a DC power supply unit that uses a second generation coil provided in said generator as a power source to generate a DC output, and an inverter that converts the output of said DC power supply unit into an AC output at a commercial frequency, said DC power supply unit having a voltage adjustment function;

a transfer switch that switches a supply target of the output of said DC power supply unit so as to supply the output of said DC power supply unit to said inverter when an external load is driven, and so as to supply the power of said DC power supply unit to said power supply line when said external load is not driven; and voltage adjustment means for assistance for adjusting an output voltage of said DC power supply unit, so as to supply a DC output having a voltage value equal to or close to a rated value of an output voltage of said first power supply system, from said DC power supply unit to said power supply line, to assist the first power supply system, when said switch is switched so as to supply the power of said DC power supply unit to said power supply line.

6. A power supply device incorporated in a vehicle driven by an internal combustion engine comprising:

a first power supply system that uses a first generation coil provided in a generator driven by said internal combustion engine for driving a vehicle as a power source to supply DC power to a power supply line that provides a power supply voltage to an electrical load or electrical loads provided in the vehicle;

a second power supply system having a DC power supply unit that uses a second generation coil provided in another generator driven by said internal combustion engine as a power source to generate a DC output, and an inverter that converts the output of said DC power supply unit into an AC output at a commercial frequency, said DC power supply unit having a voltage adjustment function;

a transfer switch that switches a supply target of the output of said DC power supply unit so as to supply the output of said DC power supply unit to said inverter when an external load is driven, and so as to supply the power of said DC power supply unit to said power supply line when said external load is not driven; and voltage adjustment means for assistance for adjusting an output voltage of said DC power supply unit, so as to supply a DC output having a voltage value equal to or close to a rated value of an output voltage of said first power supply system, from said DC power supply unit to said power supply line, to assist the first power supply system, when said transfer switch is switched so as to supply the power of said DC power supply unit to said power supply line.

* * * * *